July 23, 1946.　　　G. H. LATHAM　　　2,404,714
POLYMER PRODUCTS
Filed Nov. 4, 1944

INVENTOR.
George Henry Latham
BY Charles F. Daley
ATTORNEY

Patented July 23, 1946

2,404,714

UNITED STATES PATENT OFFICE 2,404,714

POLYMER PRODUCTS

George Henry Latham, Wilmington, Del., assignor to E. I. du Pont de Nemours & Company, Wilmington, Del., a corporation of Delaware Application November 4, 1944, Serial No. 562,012

15 Claims. (Cl. 260—32)

This invention relates to a new composition of matter and shaped articles produced therefrom. More particularly, this invention relates to an organic solvent solution of polyacrylonitrile, i. e. polymerized acrylonitrile or polymerized vinyl cyanide $(CH_2=CHCN)_x$, and copolymers and interpolymers of acrylonitrile in which at least 85% by weight of the polymer is acrylonitrile, and to the production of shaped articles from said organic solvent solution of said polymers of acrylonitrile.

This application is a continuation-in-part of the copending application of George Henry Latham, Serial No. 447,466, filed June 17, 1942.

Polyacrylonitrile and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts numerous attempts have been made to form these polymeric materials into yarns, films and other shaped articles. The present invention represents the first successful dissolution of these acrylonitrile polymers in a solvent to produce a solution which is suitable for the production of commercially useful textile yarns or wrapping tissue films and similar tough, flexible structures.

It has been known heretofore that concentrated aqueous solutions of inorganic salts such as lithium bromide, zinc chloride, and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for acrylonitrile as water, dilute acid, dilute salt solutions, etc.) results in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or film. Moreover, when it is attempted to form a multi-filament yarn by extruding, for example the proposed aqueous sodium sulfocyanide polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents, such as dioxan, monochlorbenzene, cyclohexanone, etc. However, these liquids are incapable of dissolving or even swelling polyacrylonitrile or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinium chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures, such as yarns, from the composition. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile, or a copolymer or interpolymer of acrylonitrile in which at least 85% by weight of the polymer is acrylonitrile, in a solvent which does not react with or decompose the polymer and which may be substantially completely removed from structures formed of such a solution.

It is another object of this invention to produce a solution of polyacrylonitrile, or a copolymer or interpolymer of acrylonitrile in which at least 85% by weight of the polymer is acrylonitrile, in a solvent which does not react with or decompose the polymer, the solution being suitable for the formation of commercially useful articles, for example yarns which are suitable as textile yarns and films which are suitable as wrapping tissue.

It is a further object of this invention to produce a solution of polyacrylonitrile, or a copolymer or interpolymer of acrylonitrile in which at least 85% by weight of the polymer is acrylonitrile, in a volatile organic solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce useful shaped articles and structures of polyacrylonitrile, or copolymers or interpolymers of acrylonitrile in which at least 85% by weight of the polymer is acrylonitrile.

It is still another object of this invention to produce a shaped article or structure of polyacrylonitrile, or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of the invention may be accomplished in general by dissolving polyacrylonitrile, or a copolymer or interpolymer of acrylonitrile in which at least 85% by weight of the polymer is acrylonitrile, in a dimethyl carbamyl compound which is not a salt. If the solvent has a relatively low boiling point (less than about 250° C.), the solution of the acrylonitrile polymer may then be formed into a shaped structure, for example a yarn or film, and the solvent removed from the shaped structure. When the solvent is relatively non-volatile and has a boiling point of about 300° C. or more, shaped articles may be made from the solution and at least a portion of the solvent may be retained therein as a plasticizer for the articles.

It has been recognized in recent years that under certain conditions, an atom of hydrogen is attracted by rather strong forces to two atoms, instead of only one, so that it may be considered to be acting as a bond between them. This is called the hydrogen bond.

The difficulty of dissolving polymers containing at least 85% by weight of acrylonitrile is due to the presence within the polymer molecules of strong hydrogen-bonding forces, and in order to dissolve these polymers, it is necessary to find a material which will undergo hydrogen-bonding with the active hydrogen-bonding groups of the polymer molecules and thus weaken the strong hydrogen bond within the polymer molecule and cause the hydrogen-bonding forces to be shared between molecules of the polymer and the solvent. In this manner, it is possible to form a molecular dispersion of the polymer within the solvent and thus form a solution.

However, the strength of the hydrogen-bonding capacity cannot be taken as the sole criterion as to whether or not a compound will function to dissolve an acrylonitrile polymer. It is necessary also that, in order to function as a solvent for an acrylonitrile polymer, the compound contain certain groups which will be capable of satisfactorily sharing a hydrogen-bonding force with the particular active group of the acrylonitrile polymer. In most instances, these groups require the presence of a hydrogen atom on a carbon atom to which the group is attached (designated as an alpha-hydrogen atom). Such groups as require the alpha-hydrogen atom are ineffective to impart solvent power if the alpha-hydrogen atom is missing.

It has now been found that groups capable of conferring solvent power include dimethyl carbamyl

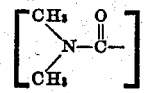

formyl imido

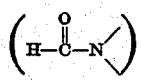

cyano (—C≡N), thiocyano (—S—C≡N) and sulfoxy

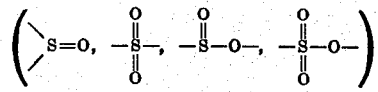

groups, provided however that the cyano, thiocyano and sulfoxy groups require attachment (through their respective unsatisfied carbon and sulfur valences) to a carbon atom which is in turn attached to at least one hydrogen atom (alpha-hydrogen) in order to render them effective. The dimethyl carbamyl and the formyl imido groups are effective in the absence of the alpha-hydrogen atom. (It is possible that they contain the equivalent of an alpha-hydrogen atom within their own structures.) Thus, the groups dimethyl carbamyl

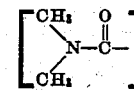

formyl imido (HCON<), cyanomethylene (>CHCN)

thiocyanomethylene (>CHSCN) and sulfoxymethylene (>CHSO—, >CHSO₂—, >CHSOO—, and >CHSO₂O—) shall hereinafter be referred to as solvogenic groups and compounds containing them are frequently capable of dissolving an acrylonitrile polymer containing at least 85% by weight of acrylonitrile.

In the event that two or more groups requiring the presence of an alpha-hydrogen atom in order to render them solvogenic are attached to the same carbon atom and compete with each other for an available alpha-hydrogen atom, the sulfoxy group, the cyano group and the thiocyano group take preference over each other in the order named, to form the solvogenic group, the lower ranking group or groups present assuming merely the nature of an inert substituent on the carbon atom.

It has furthermore been found that compounds containing the above-mentioned solvogenic groups will be solvents for the above-mentioned polymers only if the carbon content of the compound be within certain limits, the limits for the compounds of the present invention being given below. If the ratio of carbon to solvogenic groups is maintained within the said limits, the compounds will retain solvent properties for the polymer even though the molecule be of considerable size and complexity. The solvent power of the compound for acrylonitrile polymers is generally increased if more than one of the solvogenic groups is present in the molecular structure of the compound, the effect of these groups being additive.

The specificity of solvent action conferred by the solvogenic groups lies at least partially in the balance of forces which the solvent molecules exert upon each other compared with that which they exert on the hydrogen bond groupings of the polymeric molecule. In explanation, the atoms of formamide are strongly associated through hydrogen bonding as is evidenced by an abnormally high boiling point. The atoms of formamide are so firmly bonded with each other that they do not attract themselves strongly to the nitrile groups of acrylonitrile polymer and so have no solvent power for the polymer. If the hydrogen bonding capacity of formamide is decreased by substituting methyl groups for the amide hydrogens, it becomes a solvent for polyacrylonitrile. On the other hand, if the carbon content of the molecule becomes too large, for example if ethyl groups are substituted for the N-methyl groups of dimethyl formamide, it becomes a non-solvent for the acrylonitrile polymers.

It has now been found that dimethyl carbamyl compounds which are fusible without decomposition and particularly those compounds embraced by the following empirical formula and preferably having a melting point below 250° C., will dissolve polyacrylonitrile and copolymers and interpolymers of acrylonitrile in which at least 85% by weight of the polymer is acrylonitrile:

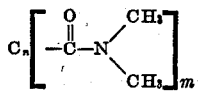

wherein $m$ and $n$ represent integers, $m$ being equal to or greater than 1, and $n$ being of such a value that the ratio $n/m$ is equal to or less than 1.5, except that when $m$ equals 1, $n$ must equal zero.

The compounds are not salts, but may be cyclic or acyclic in nature and may possess one or more ethylenic or acetylenic linkages. Valences other than those contained in carbon-to-carbon linkages and not shown as satisfied in the above empirical formula must be satisfied by hydrogen, halogen, oxygen or bivalent sulfur atoms or by hydroxyl or thiol, cyano, thiocyano or sulfoxy radicals, the total number of said halogen, oxygen, bivalent sulfur, hydroxyl and thiol substituents not exceeding one half the value of $m$, i. e. the number of —CON(CH$_3$)$_2$ groups in the compound should equal at least twice the total number of any combination of said halogen, oxygen and bivalent sulfur atoms and the hydroxyl and thiol radicals, and the total number of said cyano, thiocyano and sulfoxy substituents not exceeding the value of $m$. The two respective tolerances of one half $m$ and of $m$, for the two said groups of substituents are independent of each other and members of both groups may be present in the molecule up to their group tolerances. The said oxygen or sulfur substituents may appear in the compound as bivalent groups either as a side chain (carbonyl or thiocarbonyl) or within the chain (ether or thioether), as the case may be. It is preferred that the carbon atoms in the C$_n$ portion of the above formula be joined to each other, but this is not essential.

Representative compounds coming within the scope of the above formula and suitable for use as solvents for the above-mentioned acrylonitrile polymers include:

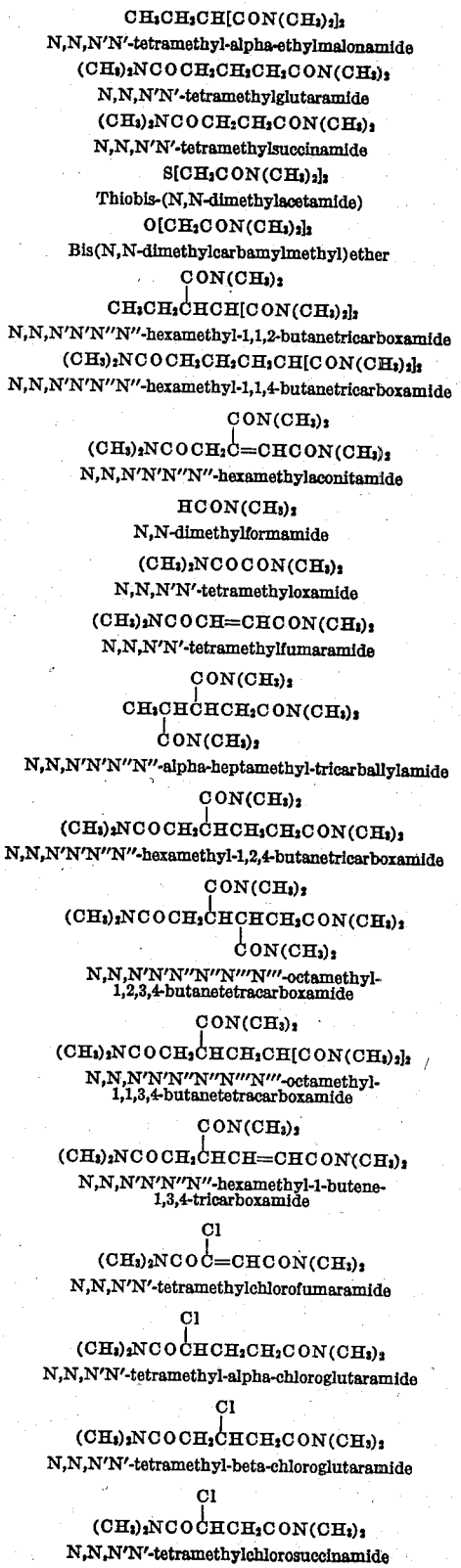

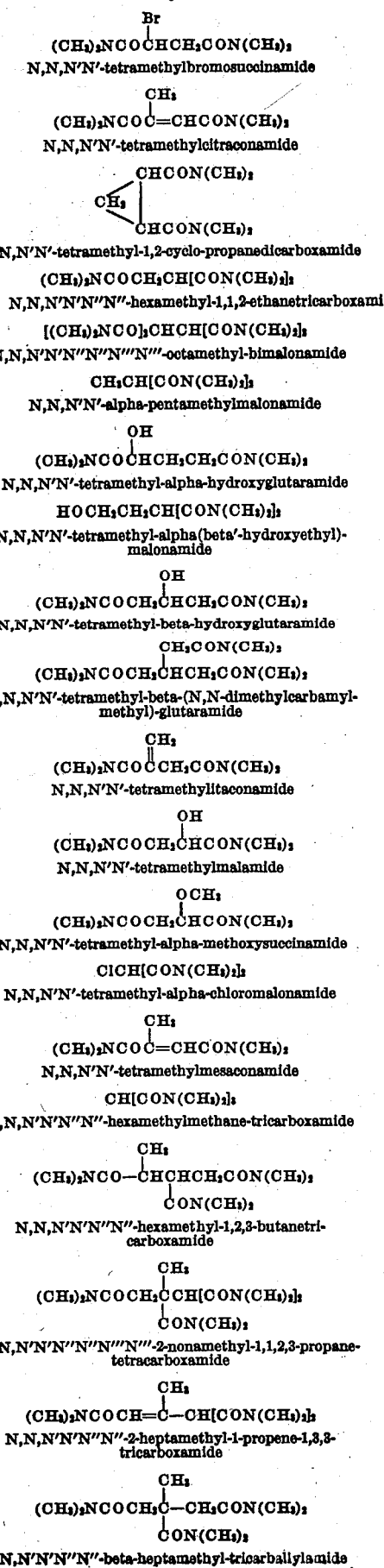
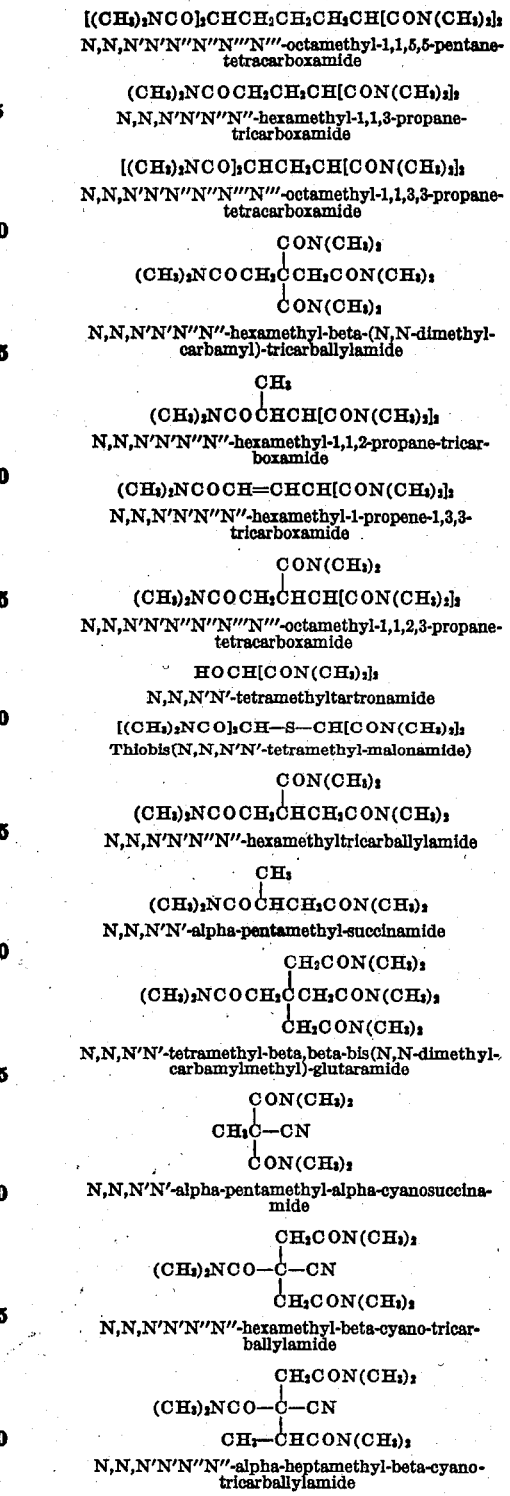

In lieu of, or in addition to the sterile CN groups in certain of the above typical compounds, other groups in the sterile state may be included in the molecule, e. g. SCN, sulfoxy, etc., provided that the tolerance limits are observed, as explained above.

All of these compounds are miscible in a wide range of proportions with polyacrylonitrile and copolymers and interpolymers of acrylonitrile and they do not appear to react with or decompose them. Many of the compounds are also miscible with (soluble in) such non-solvent liquids for the polymeric materials as water, aqueous salt solutions, alcohol, glycerol, etc. Solutions of an acrylonitrile polymer in many of the compounds of this invention can therefore be extruded into such liquids to form shaped articles such as yarns, films, etc. of the polymer, with the solvent being removed by selective solution in the liquid coagulant. Moreover, because many of the compounds of the invention (dimethyl formamide) are volatile (vaporizable without decomposition at atmospheric pressure and at temperatures not exceeding 250° C.), solutions of the polymer in such compounds are eminently suited for use in a dry spinning or casting process for the preparation of a yarn or film of the polymer.

For the purpose of definition, a solvent is a material which, when in the liquid state, is capable of forming solutions in which the polymer is present in a concentration of 5% or more. In most instances, the solvent and polymer are miscible in almost all proportions although the miscibility may take place at elevated temperatures in the case of certain compounds.

The solutions of the invention are preferably prepared by heating the polymer or copolymer or interpolymer with one or more of the compounds of this invention (dimethyl carbamyl compounds of the type mentioned above). Some of these compounds exist in the solid state at room temperature and dissolve or retain the polymer in clear solution only at elevated temperatures, for example at temperatures of 100° C. or higher, below which temperature the composition takes on the appearance of a gel. Even in such a case however, there is usually no substantial evidence of immediate separation of the gel into two phases although after standing (i. e. sometimes after a period of several weeks), the gels may undergo syneresis. This phenomenon of gel formation or syneresis is reversible however and subsequent heating of the gelled or syneresed mass causes it to revert to solution form.

In view of the relatively high melting points of some of the solvents of this invention, they would have comparatively little use in the production of an acrylonitrile polymer spinning or casting solution. Such solvents are, however, excellent solvent plasticizers for acrylonitrile polymers containing at least 85% acrylonitrile since they are soluble in a wide range of proportions with said polymers. The present invention therefore contemplates solid solutions of acrylonitrile polymers containing at least 85% by weight of acrylonitrile as well as liquid solutions thereof.

Shaped articles obtained from solvent solutions of acrylonitrile polymer prepared in accordance with the invention and from which the solvent is subsequently removed are substantially free of foreign matter and voids after removal of the solvents, and the acrylonitrile polymer remains substantially undecomposed and chemically unchanged from the original acrylonitrile polymer prior to its solution.

The above-described solutions of acrylonitrile polymer may be shaped in the form of filaments, yarns, films, tubes and like structures by apparatus and processes generally known in the art, the detailed operating conditions being suitably modified.

Suitable methods and apparatus for the production of shaped articles of the polymers of this invention will be readily apparent by reference to the following detailed description when taken in connection with the accompanying illustrations, in which.

Figure 1:
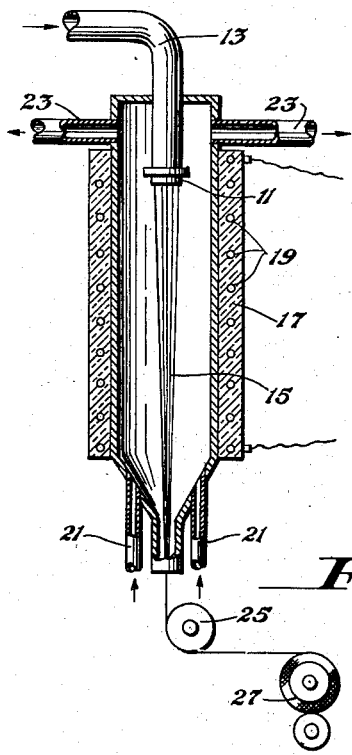
Figure 1 is a diagrammatic vertical sectional view showing a dry spinning cell suitable for use in accordance with the invention.

Referring to Figure 1 of the drawing, reference numeral 11 designates a spinneret through which a plurality of filaments 15 are formed by extruding a filament-forming solution supplied to the spinneret by means of conduit 13. The spinning cell is jacketed with a material 17 such as a refractory in which is embedded an electrical heating coil 19. The spinning cell can thus be operated at any desired temperature. A plurality of conduits 21 is provided adjacent the bottom of the device for passing evaporative medium through the cell so as to remove volatile solvent from the extruded filaments 15. The evaporative medium is removed from the cell through outlet openings 23. The yarn comprising the plurality of filaments 15 is passed from the bottom of the spinning cell around guide roller 25 and is wound on a bobbin 27.

Figure 2:
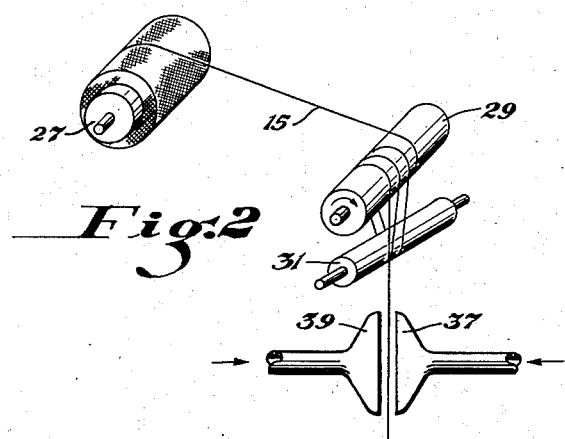
Figure 2 is a diagrammatic perspective view showing a yarn drawing device for use in connection with the invention.

Referring to Figure 2 of the drawing, the yarn 15 is removed from the bobbin package 27 and passed about draw roller 29 and separating roller 31. From draw roller 29, the yarn is passed to a second draw roller 33 and separating roller 35. The yarn is passed around the two sets of draw rollers including their separating rollers, a sufficient number of turns to prevent slippage of the yarn. Draw roller 33 is rotated at a greater speed, for example three to ten times the speed of draw roller 29. In this manner, the yarn 15 is stretched between the two draw rollers. As the yarn passes between the two draw rollers, a heating medium is brought into contact with the yarn through blower nozzles 37 and 39. The yarn passing from the draw roller 33 is wound on bobbin 41. The drawing or stretching of the spun yarn as described is not claimed as part of the present invention, but is claimed in the copending application of Daniel T. Meloon, Serial No. 496,397, filed July 28, 1943.

Figure 3:
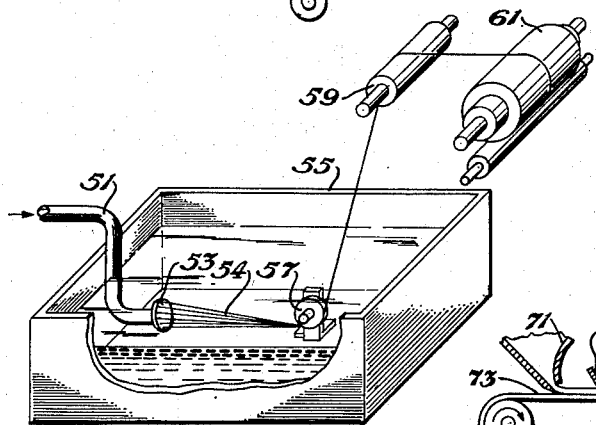
Figure 3 is a diagrammatic perspective view showing a wet spinning apparatus for use in the invention.

Figure 3 of the drawings illustrates a wet spinning apparatus for the production of yarn. The acrylonitrile polymer solution is passed through conduit 51 and is extruded through spinneret 53 to form a multifilament yarn 54. The yarn 54 is passed about guide roller 57 which is positioned within the coagulating liquid in tank 55. The yarn is then passed about guide roller 59 and is wound on bobbin 61.

Figure 4:
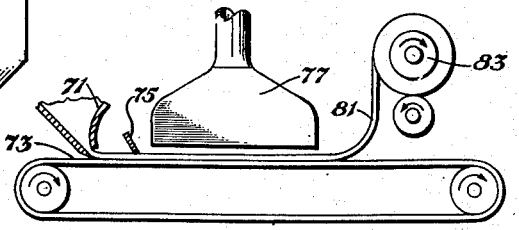
Figure 4 is a diagrammatic side elevational view showing a suitable film casting apparatus for use in accordance with the invention.

The organic solvent solution of the acrylonitrile polymer may be cast in the form of a film as illustrated in Figure 4. In accordance with this apparatus, the polymer solution is passed from hopper 71 on to the endless steel band 73 where it is smoothed by means of a doctor knife 75. The band, together with the film, is passed under a means 77 for bringing a heated drying medium into contact with the film. The film 81 is pulled from the band 73 and collected on a mill roll 83.

The polyacrylonitrile for use with this invention is preferably prepared by the ammonium persulfate catalyzed polymerization of monomeric acrylonitrile dissolved or emulsified in water. It can however be prepared by any other suitable type of polymerization reaction such as, for example, the emulsion type reaction disclosed by U. S. Patent No. 2,160,054 to Bauer et. al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \frac{\text{viscosity of solution}}{\text{viscosity of solvent}} - 1$ and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile having a molecular weight of approximately 60,000 can be prepared as follows: To 94 pounds of distilled water, heated to 40° C., add 40 grams of ammonium persulfate catalyst and 80 grams of sodium bisulfite activator. Then add 16 pounds of acrylonitrile slowly with stirring over a period of two hours. The polyacrylonitrile having the above-said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably possessing a molecular weight of 15,000 to 250,000 or higher can be prepared in a similar manner.

The following examples in which parts, proportions and percentages are by weight unless otherwise specified, illustrate preferred methods of preparing solutions in accordance with the principles of this invention, and of employing these solutions in the manufacture of commercially satisfactory shaped articles. The invention is not to be limited by the details set forth in the examples.

Example I

One hundred (100) parts of polyacrylonitrile having an average molecular weight of 60,000 are ground to a particle size of 20 mesh (20 meshes per inch) and added to 300 parts of dimethyl formamide cooled to 0° C., and subjected to vigorous stirring. After about one minute, the low viscosity slurry initially obtained is transformed to a highly viscous, doughlike mass. The stirring is then discontinued and the temperature of the mass is raised gradually over a period of about one hour to 60° C. whereby a clear, viscous solution of acrylonitrile polymer in dimethyl formamide is obtained. When heated to 130° C., the solution which is still clear has a viscosity of approximately 190 poises. When cooled to lower temperatures the solution becomes more viscous but remains homogeneous and possesses many of the characteristics of a true solution.

Example II

Seventeen (17) parts of a copolymer consisting of 90% acrylonitrile and 10% vinyl thiolacetate having a molecular weight of 100,000 and prepared by the aqueous emulsion polymerization of acrylonitrile and vinyl thiolacetate are dissolved in 83 parts of dimethyl formamide at a temperature of 0° C. The mass is then heated to 60° C. to obtain a clear, viscous solution.

Example III

Fifteen (15) parts of polyacrylonitrile having an average molecular weight of approximately 102,000 are added to 85 parts of N,N,N'N'tetramethyl succinamide heated to 100° C. The mixture is vigorously stirred for approximately one minute. At the end of this time, the temperature is raised gradually to 145° C., whereby a clear solution having a viscosity of approximately 38 poises is obtained.

Example IV

Ten (10) parts of polyacrylonitrile having an average molecular weight of 250,000 are ground to a particle size of 20 mesh and added with vigorous stirring to 90 parts of dimethyl formamide cooled to 0° C. After approximately one minute, the stirring is stopped and the temperature of the resulting doughlike mass is raised gradually to 90° C. to yield a clear solution having a viscosity of approximately 700 poises.

Example V

One hundred thirty (130) parts of polyacrylonitrile having an average molecular weight of 110,000 are added to 870 parts of tetramethyl oxamide heated to 90° C., and the mixture stirred for two hours at 140° C. The clear, homogeneous solution thus obtained is suitable for wet spinning.

Example VI

The solution of Example I is extruded at a rate of 10.1 grams per minute and at a temperature of 130° C. downwardly through a spinneret having ten holes 0.125 mm. in diameter, into a tubular cell through which heated air is circulated in an upward direction. The walls of the cell are maintained at a temperature of approximately 400° C. The fresh air enters the lower portion of the chamber at a temperature of about 100° C. while the waste air leaving the upper portion of the cell is at a temperature of about 200° C. The cell has a length of 8 feet, sufficient for the evaporation of the dimethyl formamide from the extruded solution. The solidified, multifilament acrylonitrile polymer yarn issuing from the bottom of the cell is collected on a rotating bobbin at a speed of 100 yards per minute. The yarn which has a denier of 248 is soft and pliable and has a dry tenacity of 0.62 gram per denier, a wet tenacity of 0.53 gram per denier and dry and wet elongations of 12.7% and 24.1% respectively. The yarn is soluble in dimethyl formamide and the several other specific solvents mentioned above, but is insoluble in water and all common organic solvents. It is substantially colorless and has a glossy appearance. Its elementary analysis corresponds to that of the polymer of acrylonitrile originally dissolved in the dimethyl formamide. The collected yarn is then unwound from the collecting bobbin, passed without slippage about a positively driven roller, heated to a temperature of 105° C. and wound upon a rotating bobbin, the peripheral speed of which is eight times that of the heated roller. The resulting yarn which has been permanently stretched by this treatment has a dry tenacity of 3.4 grams per denier and an elongation in the dry state of 10%. Its physical properties are not substantially affected by prolonged exposure to hot aqueous sulfuric acid in concentrations as high as 25%. This stretched yarn differs from yarns of other polymerized vinyl compounds in that it does not shrink to any great extent on reheating. For example, the shrinkage in boiling water will be found to be of the order of 5%.

Example VII

The solution of Example II is formed into a yarn in the same manner as above described in Example VI. The resulting yarn has substantially the same physical properties as the yarn of Example VI.

Example VIII

The solution of Example I is extruded at a rate of 5.24 grams per minute through a spinneret having forty holes 0.0045 inch in diameter, into a water bath heated to 70° C. After a short bath travel, the resulting yarn is withdrawn from the bath and collected on a rotating bobbin. This yarn is then, preferably without drying, stretched to 6.3 times its original length while passing about a roller heated to 200° C. as in Example VI. The stretched yarn resembles quite closely in its physical properties the stretched yarn of that example.

Example IX

The solution obtained in Example IV is applied at that temperature (90° C.) to a flat metal surface maintained at a temperature of 100° C., the solution being applied by means of a doctor knife with a clearance of 0.013 inch between the plate and the knife. Preheated air (125° C.) is passed over the plate for a period of time sufficient to remove substantially all of the solvent from the film. The film of acrylonitrile polymer remaining on the plate is then removed from the plate to yield a strong transparent sheet of approximately 0.001 inch thickness. The sheet, in addition to being flexible and resistant to tearing, is insensitive to the common volatile organic solvents. It is substantially impervious to oils, hydrocarbons and common organic substances. It is approximately sixteen times as impervious to the transmission therethrough of moisture vapor as a sheet of regenerated cellulose of the same thickness. In addition, the sheet possesses a brilliant clearness that makes it especially desirable for commercial use. The film can, if desired, be stretched longitudinally and transversely to improve its strength in these directions. It is characteristic of this stretched film that it does not shrink greatly when subjected to elevated temperatures. For example, such a film when subjected to a temperature of 175° C., will shrink approximately 10%.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range of 15 to 750 poises; when the polymer has a molecular weight of 250,000 or more, this requires that the maximum concentration of polymer in the spinning solution be of the order of 10%. Generally, it is preferred that the spinning solution contain at least 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentrations of the order of 15% to 25% and at a desirable spinning temperature of the order of 100° C. to 150° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

The evaporative medium employed in the dry spinning of filaments and yarns or the dry casting of films in accordance with this invention may be any vapor inert to the film- or filament-forming solution, such as air, nitrogen, steam, etc., or any suitable mixture thereof. The temperature of the evaporative medium is dependent on such factors as the dimensions of the spinning cell, the composition and rate of extrusion of the spinning solution and the rate of flow of the evaporative medium. It is only necessary that these several factors be so correlated that the yarn or other shaped article leaving the spinning cell be sufficiently freed of the solvent so that it is solidified and capable of being wound into package form or otherwise collected.

As indicated in Example VIII above, shaped articles of acrylonitrile polymer can also be formed by extruding the spinning solution into a suitable precipitating bath comprising a liquid that is miscible with the solvent but is a chemically inert non-solvent for the acrylonitrile polymer. As examples of such a liquid may be mentioned water, glycerin, organic solvents such as alcohol, ether, etc. or aqueous solutions of salts, alkalies or acids.

The length of travel of the shaped article through the precipitating or coagulating liquid is not critical to the invention, provided only that it be sufficiently long to solidify the acrylonitrile polymer. When the precipitating bath is water, the bath travel may be as short as ½ inch, or it may be 18 or more inches in length. When the precipitating liquid is an aqueous salt solution such as 20% solution of calcium chloride, the solidification of the acrylonitrile polymer structure is generally more gradual than in the case of water so that it is necessary to use a somewhat longer bath travel than with water. If desired, suitable means, such as guide rods or rollers may be placed in the bath to tension the yarn or other shaped article during its formation.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched to from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained greatly improves the physical properties of the structure, including its tenacity, its resilience, etc.

This stretching of the shaped article can also be accomplished by causing the article, while passing between stretching rollers, to contact a heated stationary pin, or to pass through an inert medium such as air, water, glycerin, etc. heated to a high temperature. Obviously, the article must not be exposed to this high temperature for a period sufficiently long to decompose the polymer. In general however, the time of contact of the article with the heated medium is so short that temperatures up to 250° C. can be employed. Although it is generally preferred to heat the article to a temperature of at least 100° C. during the stretching operation, this is not essential. Desirable results can be obtained by stretching the article without the application of heat, for example by stretching at room temperature.

In addition to acting as solvents for polyacrylonitrile or copolymers or interpolymers of acrylonitrile, the dimethyl carbamyl compounds of this invention, when present in small amounts, can also be used as plasticizing agents for the polymer and the higher boiling compounds of the invention are especially suited for such use. At the same time, it is, of course, to be understood that non-solvent softeners, such as glycerol, etc., can also be incorporated in the solutions of this invention, these materials remaining in the subsequently formed articles to impart a softening effect. If it is desired to use such plasticizing or softening agents with polyacrylonitrile, they are preferably added in the desired amount to an already formed solution of the polymer in a lower boiling solvent, for example to a solution of the polymer in dimethyl formamide.

Although the discussion thus far has been directed mainly toward the manufacture of yarns and films of acrylonitrile polymer, the solutions provided by the invention and the evaporative and wet spinning processes described above are equally well adapted for use in the manufacture of other shaped articles of acrylonitrile polymer, such as artificial horsehair, straws, bristles, tubes, bands and ribbons. For example, the solutions may be extruded through a suitable die and into a heated atmosphere or precipitating bath to form a tubular structure, or it may be extruded in any other desired manner. Moreover, because the solvents of the invention are miscible in a wide range of proportions with acrylonitrile polymer, the powdered polymers may be treated with small amounts of the solvent to yield a substance suitable for use in the formation of molded articles. This is a particularly important result inasmuch as it has heretofore been difficult to use this material in molding operations. In this same manner, a plurality of sheets of acrylonitrile polymer may be treated with small amounts of solvents and pressed together to form laminated articles. When present in the shaped article, the solvents of this invention (particularly those of high boiling point) are excellent plasticizers. Of course, the shaped articles may also be treated with non-solvent softening agents, for example glycerol. These plasticizing and softening agents may be incorporated in the solution of this invention or they may be applied to the shaped article as an after-treatment; or they may be added to the acrylonitrile polymer by a milling operation wherein the agents and polymers are worked between rotating rollers until a mass of the desired consistency is obtained.

This invention is primarily concerned with the steps of dissolving acrylonitrile polymer in a suitable solvent to form a stable solution adapted for use in the manufacture of shaped articles of acrylonitrile polymer. It is characteristic of the invention that the solutions provided by it are stable; i. e. the solvents do not cause a decomposition or chemical alteration of the dissolved acrylonitrile polymer. At the same time, it is also characteristic that the solvents provided by the invention are also useful in the dissolving of mixtures of acrylonitrile polymer and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the polyacrylonitrile solution to modify the properties, both chemical and physical, of the resulting shaped articles.

Although this invention has been described with particular regard to polyacrylonitrile, i. e. polymerized vinyl cyanide, the solvents and processes of this invention are equally useful in forming clear, stable solutions of such acrylonitrile copolymers and interpolymers as were considered heretofore to be insoluble in volatile organic solvents, i. e. acrylonitrile copolymers and interpolymers containing at least 85% by weight of acrylonitrile; such solutions can be used in the same way and for the same purposes as described herein with respect to polyacrylonitrile. It is therefore considered to be within the scope of this invention to dissolve in the above-mentioned solvents copolymers and interpolymers in which acrylonitrile is copolymerized or interpolymerized with polymerizable substances such as, for example, compounds containing one or more ethylenic linkages, e. g. vinyl acetate, vinyl chloride, acrylic acid and its esters and homologues, styrene, isobutylene and butadiene, as well as other vinyl and acrylic compounds, other olefinic or diolefinic hydrocarbons, etc. and polymers of such substances. The solvents of the present invention will also be useful as new solvents for acrylonitrile polymers which have less than 85% by weight of acrylonitrile and especially those having an average molecular weight of 15,000 to 250,000 as determined by viscosity data using the Staudinger equation and intended particularly for use in the manufacture of yarns and films.

The invention also provides a class of materials that is eminently suited for use in plasticizing structures comprising the acrylonitrile polymers. The materials provided by this invention are apparently true solvents for the above-mentioned acrylonitrile polymers. They do not tend to react with or decompose the polymer, the polymeric material obtained from the solution of this invention apparently being of the same identical chemical composition as the initial polymer. Thus, the solvents and solutions of acrylonitrile polymer provided by this invention when used in relatively small amounts are capable of softening and moistening solid particles of polymers of acrylonitrile having at least 85% by weight of acrylonitrile whereby it is possible to form molded articles of acrylonitrile polymer. Such a process is especially adapted to the formation of laminated structures from films of polyacrylonitrile, or even from films of other substances.

The invention provides practical methods for preparing shaped articles of polymers of acrylonitrile having at least 85% by weight of acrylonitrile, which articles are characterized by desirable physical and chemical properties. For example, the articles are resistant to the action of water and the common organic solvents. They are not affected by prolonged contact with relatively concentrated solutions of sulfuric acid, or other mineral acid, nor are they affected by dry cleaning solvents, etc. They differ from articles of other polymerized vinyl compounds, such as polymerized vinyl chloride, in that they do not shrink greatly when heated to high temperatures. They possess a desirable high dielectric strength and are not harmed by prolonged exposure to ultra-violet light. They are also very resistant to the action of mold and bacteria growth.

Yarns, films and similar articles of acrylonitrile polymer prepared in accordance with this invention can be stretched to yield oriented structures that possess a high tenacity, a desirable elongation, and a high elastic recovery that compares favorably with that of silk. The articles are not contaminated with undesirable salts and they are substantially free of void spaces. The films, tubings and similarly shaped articles are approximately sixteen times as impervious to the transmission of moisture vapor as are films, tubings, etc. of regenerated cellulose of the same thickness. They are substantially impervious to oils and hydrocarbons including aviation gasolines.

Because of these several unique properties which may be combined here in a single substance, acrylonitrile polymer articles produced in accordance with the principles of this invention find many important uses. While yarns made from these polymers are capable of use wherever yarns have previously been used with more or less advantage, there are certain fields where the properties of the polymer especially commend them. For example, the high tenacity, flexibility and resilience of the yarns of the invention make them suitable for use in the manufacture of hosiery and other articles of clothing while the resistance to soiling and ease of cleaning (common cleaning agents may be used on them without danger) make them desirable for use in flat fabrics, and either as multifilament or monofilament yarns in the manufacture of pile fabrics including velvets, plushes, upholstery or carpeting. The yarns can be advantageously used as either the pile and/or backing of such fabrics. At the same time, their low water absorption, high resistance to mold and bacteria growth and pronounced resistance to ultra-violet light make the yarns highly suited for use in outdoor fabrics such as tents, awnings, tarpaulins, flags, sails and the like. These same factors, taken together with the low density of the yarn (specific gravity of 1.16 as compared with 1.52 for cellulose), also permit the yarns to be manufactured into clothing and other articles for use in tropical climates where light weight, flexible fabrics that resist the action of weather, direct sunlight and mold growth are required. Other uses based on these same and related properties include the manufacture of the yarns into fishing lines, fish nets, cordage especially for marine purposes, bathing suit, umbrellas and the like. It is, of course, to be understood that the yarns of the invention can be employed in these uses in the form of either continuous filaments or as staple fibers of any given length. They can be formed into novelty yarns with other fibers, both natural and synthetic in character, and because of their high resilience, the staple fibers of the invention, particularly when crimped, are highly suited for admixture with wool.

Still other uses, particularly for monofilamentary structures of the polymer, include the manufacture of rattan-like fabric for furniture, bristles and window screening wherein the light weight, low water absorption, and high resistance of the polymer to ultra-violet light, sulfur fumes and salt air are important attributes. Moreover, the high flexibility and durability of such structures enable screens made of them to be rolled up when not in use, thus permitting their incorporation as an integral part of the window structure.

As previously mentioned, the acrylonitrile polymers with which this invention is concerned are highly resistant to the action of acids and most other chemical reagents including oils, greases and the like and this fact, taken together with their high softening point and controlled shrinkage, makes yarns of the polymer highly useful in industrial applications including such uses as filter cloths, covers for rayon spinning bobbins and cakes, clothing for workers in areas where acids and other corrosive fumes are present and the like. Still another important use, dependent mainly on its resistance to acids, comprises the manufacture of the yarn or other shaped articles of the polymer including films and tubings into liners, separators or other protective parts for storage batteries, particularly of the heavy duty type.

The above uses are primarily concerned with yarns (either multifilamentary or monofilamentary in character) of the polymer. However, it will be understood that the same desirable properties (also present in other shaped articles of the polymer such as film, tubing and the like) make these other articles useful in similar applications such as the protection of objects from the effects of moisture, common organic solvents and chemical reagents and as containers or tubings for the packaging or transport of liquids including corrosive liquids, oils, greases and the like. Moreover, because of their clarity and brilliance, films of an acrylonitrile polymer prepared in accordance with this invention also find an important use in the decorative art.

The solutions prepared in accordance with the present invention are also suited for use as lacquers or coating compositions and are especially suitable for use in the coating of wire and electrical parts where the high chemical and electrical resistance of the polymer is important.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group

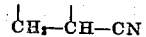

that is, at least 85% by weight of the reactant material converted into and forming the polymer is acrylonitrile.

Reference is made to the copending application of Ray Clyde Houtz, Serial No. 491,945, filed June 23, 1943, which covers the low temperature mixing of finely divided acrylonitrile polymers in a solvent, followed by heating to dissolve the polymer. Reference is also made to the copending application of William W. Watkins, Serial No. 496,376, filed July 28, 1943, which covers the wet spinning of acrylonitrile polymer yarns by extruding solutions of acrylonitrile polymers, into baths, which are preferably hot baths, composed of liquids such as glycerol and aqueous solutions of salts, with substantial tension and stretch preferably being imposed during spinning.

Since it is obvious that many changes and modifications can be made in the above described details without departing from the nature and spirit of the invention, it is to be understood that the invention is not to be limited to the details described herein except as set forth in the appended claims.

I claim:

1. As a new composition of matter a polymer of acrylonitrile containing in the polymer molecule at least 85% by weight of acrylonitrile and a dimethyl carbamyl compound embraced by the formula:

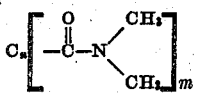

wherein $m$ and $n$ are integers, $m$ being at least 1, $n$ being of such a value that the ratio $n/m$ does not exceed 1.5, except that when $m$ equals 1, $n$ must equal zero, all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of said halogen, oxygen, sulfur, hydroxyl and thiol substituents not exceeding one half the value of $m$ and the total number of cyano, thiocyano and sulfoxy groups not exceeding the value of $m$.

2. As a new composition of matter a polymer of acrylonitrile containing in the polymer molecule at least 85% by weight of acrylonitrile dissolved in a solvent comprising a dimethyl carbamyl compound embraced by the formula:

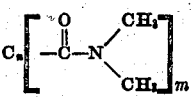

wherein $m$ and $n$ are integers, $m$ being at least 1, $n$ being of such a value that the ratio $n/m$ does not exceed 1.5, except that when $m$ equals 1, $n$ must equal zero, all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of said halogen, oxygen, sulfur, hydroxyl and thiol substituents not exceeding one half the value of $m$ and the total number of cyano, thiocyano and sulfoxy groups not exceeding the value of $m$.

3. A new composition of matter as defined in claim 2 in which the polymer is polyacrylonitrile.

4. A new composition of matter as defined in claim 2 in which the polymer has a molecular weight of between 15,000 and 250,000.

5. A new composition of matter as defined in claim 2 in which the polymer has a molecular weight of between 40,000 and 150,000.

6. A new composition of matter as defined in claim 2 in which the solution has a viscosity within the range 15 to 750 poises.

7. As a new composition of matter, a polymer of acrylonitrile containing in the polymer molecule at least 85% by weight of acrylonitrile dissolved in dimethyl formamide.

8. A new composition of matter as defined in claim 7 in which the polymer of acrylonitrile is polyacrylonitrile.

9. The composition of claim 2 in which the solution contains at least 10% of said polymer of acrylonitrile.

10. The composition of claim 7 in which the solution contains at least 10% of said polymer of acrylonitrile.

11. The composition of claim 7 in which the polymer has a molecular weight of between 15,000 and 250,000.

12. The composition of claim 7 in which the polymer of acrylonitrile is polyacrylonitrile having a molecular weight of between 15,000 and 250,000.

13. The composition of claim 7 in which the polymer has a molecular weight of between 40,000 and 150,000.

14. The composition of claim 7 in which the polymer of acrylonitrile is polyacrylonitrile having a molecular weight of between 40,000 and 150,000.

15. The composition of claim 7 in which the solution has a viscosity within the range 15 to 750 poises.

GEORGE HENRY LATHAM.